(12) United States Patent
Contreras et al.

(10) Patent No.: US 9,541,197 B2
(45) Date of Patent: Jan. 10, 2017

(54) SEAL SYSTEM AND METHOD OF MANUFACTURE

(75) Inventors: Gerardo Plata Contreras, Santiago de Queretaro (MX); Douglas Alan Jones, Bellaire, TX (US); Sofia Cayón Aguilar, Santiago de Queretaro (MX)

(73) Assignee: General Electric Company, Schenectady, NY (US)

( * ) Notice: Subject to any disclaimer, the term of this patent is extended or adjusted under 35 U.S.C. 154(b) by 140 days.

(21) Appl. No.: 13/151,205

(22) Filed: Jun. 1, 2011

(65) Prior Publication Data
US 2012/0306164 A1 Dec. 6, 2012

(51) Int. Cl.
| | |
|---|---|
| *F28F 7/00* | (2006.01) |
| *F16J 3/04* | (2006.01) |
| *F16J 15/52* | (2006.01) |
| *B29C 43/20* | (2006.01) |

(52) U.S. Cl.
CPC ............ *F16J 3/041* (2013.01); *B29C 43/203* (2013.01); *F16J 15/52* (2013.01)

(58) Field of Classification Search
USPC .................... 277/634, 630, 635, 637, 654
See application file for complete search history.

(56) References Cited

U.S. PATENT DOCUMENTS

| | | | | |
|---|---|---|---|---|
| 2,199,250 A | * | 4/1940 | Stroebel | 277/634 |
| 2,766,970 A | * | 10/1956 | Horn | 165/9 |
| 3,255,839 A | * | 6/1966 | Goldman | 180/254 |
| 4,173,252 A | | 11/1979 | Sakaki et al. | |
| 4,305,594 A | | 12/1981 | Handa | |
| 4,382,634 A | * | 5/1983 | Fox et al. | 299/37.5 |
| 4,408,769 A | * | 10/1983 | Wolff | 277/504 |
| 4,441,726 A | * | 4/1984 | Uhl | 277/652 |
| 4,529,212 A | | 7/1985 | Beckmann | |
| 4,735,260 A | | 4/1988 | Wohrl et al. | |
| 5,094,290 A | * | 3/1992 | Buckreus | 165/83 |
| 5,193,977 A | * | 3/1993 | Dame | 415/206 |
| 5,213,346 A | * | 5/1993 | Thomson et al. | 277/315 |
| 5,667,224 A | * | 9/1997 | Streckert et al. | 277/634 |
| 5,950,707 A | * | 9/1999 | Kozacka et al. | 165/9 |
| 6,227,546 B1 | * | 5/2001 | Halling | 277/312 |
| 6,234,488 B1 | * | 5/2001 | Martin et al. | 277/315 |
| 6,270,082 B1 | * | 8/2001 | Hegemier | 277/502 |
| 6,322,085 B1 | * | 11/2001 | Martin et al. | 277/607 |
| 6,386,551 B1 | * | 5/2002 | Martin | 277/634 |
| 6,474,408 B1 | | 11/2002 | Yeh et al. | |
| 6,576,312 B1 | * | 6/2003 | Ito et al. | 428/36.91 |
| 7,048,278 B2 | * | 5/2006 | Murakami et al. | 277/592 |
| 7,887,286 B2 | * | 2/2011 | Abgrall | F01D 5/225 277/647 |
| 2005/0051972 A1 | * | 3/2005 | Wang | 277/634 |
| 2005/0230924 A1 | * | 10/2005 | Varriale | 277/634 |
| 2009/0115142 A1 | * | 5/2009 | Kuczera et al. | 277/634 |
| 2010/0187774 A1 | * | 7/2010 | Sanchette et al. | 277/654 |

* cited by examiner

*Primary Examiner* — Kristina Fulton
*Assistant Examiner* — Eugene G Byrd
(74) *Attorney, Agent, or Firm* — Fletcher Yoder, P.C.

(57) ABSTRACT

A system including a seal is provided. The seal includes a first layer made of a first non-metallic, elastic material. The seal further includes a second layer made of a second non-metallic, heat resistant material. The second layer is configured to thermally protect the first layer from heat. The seal is configured to extend across a gap between first and second surfaces, and the first and second layers are formed into a bended structure configured to expand and contract in response to a dimensional change in the gap.

19 Claims, 7 Drawing Sheets

SEAL SYSTEM AND METHOD OF MANUFACTURE

BACKGROUND OF THE INVENTION

The subject matter disclosed herein relates to seals, and more specifically, to seals used in thermal systems.

Thermal systems may include chambers used to process a variety of thermal fluids. For example, turbine systems may include an intercooler or heat exchanger having at least two chambers, such as an exterior chamber (e.g., shell chamber) and an interior chamber (e.g., tube chamber). A seal assembly may be used to bridge interstices or gaps between the chambers. Unfortunately, thermal expansion and contraction may cause the gaps to shrink or grow, thereby causing the seal assembly to leak.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system including a seal is provided. The seal includes a first layer made of a first non-metallic, elastic material. The seal further includes a second layer made of a second non-metallic, heat resistant material. The second layer is configured to thermally protect the first layer from heat. The seal is configured to extend across a gap between first and second surfaces, and the first and second layers are formed into a bended structure configured to expand and contract in response to a dimensional change in the gap.

In a second embodiment, a system including an expansion joint seal is provided. The expansion joint seal includes a first mount portion configured to be fastened to a first surface, and a second mount portion configured to be fastened to a second surface. The expansion joint seal also includes an intermediate portion extending between the first and second mount portions. The intermediate portion includes at least one bend configured to enable expansion and contraction of the expansion joint seal across a gap between the first and second surfaces while the first and second mount portions are fastened to the respective first and second surfaces.

In a third embodiment, a method is provided. The method includes disposing a first substrate on top of a second substrate and disposing the second substrate on top of a third substrate. The method further includes positioning the first, the second, and the third substrates on a mold and heating the mold. The method also includes compressing the first, the second, and the third substrates in the mold, wherein the mold comprises a shape configured to enable the seal to expand and to contract, and the shape comprises a "U" shape, a "V" shape, a square shape, or a combination thereof.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Thermal systems may include heat exchangers having sealed chambers suitable for transferring heat from a first chamber into a second chamber. For example, thermal systems may include combustion systems, turbine systems, and various turbomachinery. In certain embodiments, a turbine system may include an intercooler or heat exchanger suitable for cooling certain turbine fluids, such as compressed air. The intercooler may be disposed internal to the turbine system or external to the turbine system. The intercooler may include two main mechanical chambers, a shell chamber and a tube bundle chamber. Hot fluid (e.g., air) may be directed from the turbine system into the shell chamber for heat exchange purposes. The hot fluid may result in the hot shell chamber (i.e., outer chamber) exchanging thermal energy with cold fluid (e.g., liquid coolant) in the cold tube bundle chamber (i.e., inner chamber). A seal, such as an expansion joint seal, may be used to contain or block any fluid flows between the inner and the outer chambers. However, thermal gradients may develop in the inner, outer, or both chamber, causing the inner either or both chamber(s) to expand or contract. Such expansions and contractions may lead to leaks, which reduce the overall efficiency of the intercooler.

A flexible seal is described herein that enables a movement of the seal in different directions (e.g., axial and radial directions) while continuing to provide a suitable blocking of fluid flows. For example, the seal may be attached to surfaces of the inner chamber of the intercooler. The attached seal enables multiple cycles of thermally-related movements of the surfaces, while continuing to provide suitable blockage of fluid flows. Indeed, the seal may expand and contract along with the surfaces, so as to continue to maintain a suitable barrier against fluids flowing in or out of the inner chamber of the intercooler. The seal may incorporate certain bendable shapes, such as one or more "U" shapes, "V" shapes, "S" shapes, and/or square shapes, suitable for expanding and contracting the seal. For example, the shapes may be disposed in an accordion-style arrangement having folds or bellows, thus allowing the seal to expand and contract correlative with expansions and contractions of the inner, outer or both chamber's surfaces.

By expanding and contracting alongside the inner chamber's surfaces, the seal may enable an improved number of cycles of thermal expansions and contractions of the inner chamber, in certain embodiments, of at least approximately between 2,500 and 50,000 expansion and/or contraction cycles. Further, the seal may incorporate certain materials having improved temperature tolerances, such as aramid materials (e.g., Nomex™, Kevlar), fire retardant nylon, fire retardant rayon, oxidized Pan fabric materials (e.g., Pyromex™), or any combination thereof. The temperature resistant material may enhance the life of the seal in higher temperature environments (e.g., at least approximately between 150° C. and 275° C.). The seal may also include certain materials that enhance flexibility and resistance to moisture, such as a synthetic rubber, a natural rubber, a polymer based material, a co-polymer based material, and/or an elastomer. Further, the flexible seal may be manufactured to follow contours of the attached surfaces, such as curved bends and straight lines. Accordingly, the seal may be installed in a variety of environments, including higher temperature environments exhibiting thermally-induced movements, such as the turbine system's intercooler.

Figure 1:
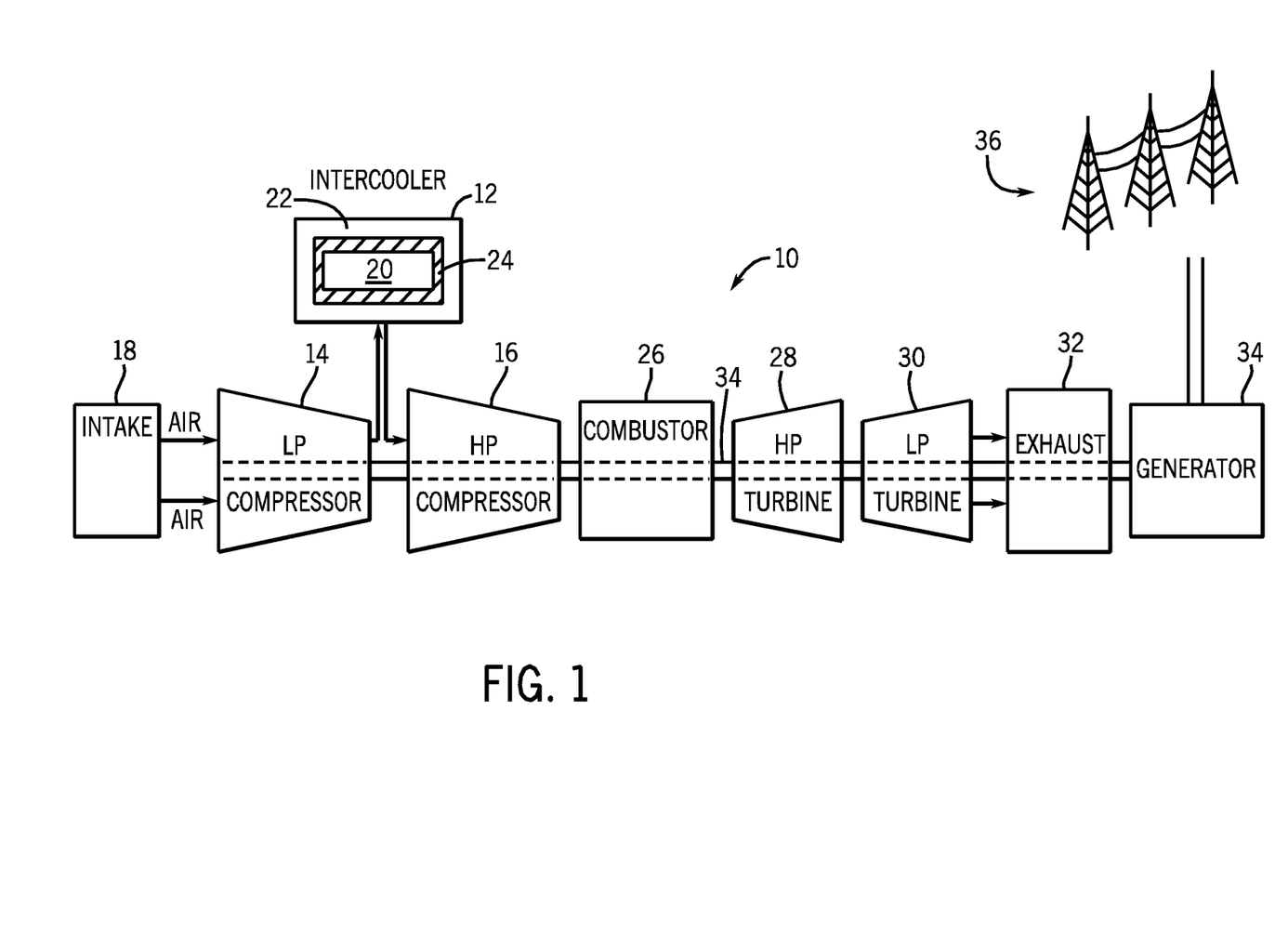
FIG. 1 is a block diagram an embodiment of a seal disposed in a heat exchanger of a turbine system.

FIG. 1 illustrates an embodiment of a turbine system 10 that may be used to provide power, such as electrical and/or mechanical power. Certain of the turbine systems 10, such as the LMS 100 turbine system 10 available from General Electric Co., of Schenectady, N.Y., may include an intercooler 12. It is to be understood that the turbine system 10 may be any turbine system designed to convert fuel into a rotative power. Accordingly, different arrangements of turbine components may be used, and FIG. 1 describes a representative example. The intercooler 12 may increase the efficiency of the turbine system 10, for example, by cooling a hot fluid (e.g., compressed air) directed from a low pressure (LP) compressor 14, and directing the cooled fluid (e.g., compressed air) into a high pressure (HP) compressor 16. For example, a fluid, such as air, may enter an intake 18 and become compressed by the LP compressor 14. The air compressed by the LP compressor 14 may gain thermal energy (i.e., heat) during compression. For example, the compressed air may be at a temperature of approximately between 50° to 300° Celsius. The higher temperature air may then be directed into the intercooler 12. The intercooler 12 may include two chambers, e.g., an inner tube bundle chamber 20 and an outer shell chamber 22. The hot air may enter the outer shell chamber 22, and exchange heat with the cooler inner tube bundle chamber 20, thus reducing the temperature of the hot air. In certain embodiments, the inner tube bundle chamber 20 may flow a cooling fluid, such as water to transfer heat away from the hot air to produce cooler air. The cooler air may then be directed into the HP compressor 16. By cooling the air provided to the HP compressor 16, higher energy efficiencies may be achieved. For example, the cooler air may reduce the work of compression in the HP compressor 16, while increasing mass flow of air into the turbine system 10, thus increasing overall efficiency.

A seal 24 is disposed between the inner tube chamber 20 and the outer shell chamber 22, so as to block fluid flow (e.g., leakage) between both chambers 20 and 22. The chamber 20 and/or 22 may thermally expand and contract, in some cases, exhibiting movement between approximately 0.5 cm and 10 cm. In certain embodiments, the seal 24 may also expand to follow the expansion of the chamber 20, while also maintaining a suitable bather to fluid flows between the chambers 20 and 22. Indeed, the seal 24 may expand and contract to suitably block fluid flows (e.g., leakage); even in sealed locations having bends or curves, thus improving the overall efficiency of the turbine system 10.

As depicted, the turbine system 10 may include a combustor 26, which receives and combusts a fuel air mixture to generate hot pressurized exhaust gases. The turbine system 10 directs the exhaust gases through a high pressure (HP) turbine 28 and a low pressure (LP) turbine 30 toward an exhaust outlet 32. The HP turbine 28 may be part of a HP rotor. Similarly, the LP turbine 30 may be part of a LP rotor. As the exhaust gases pass through the HP turbine 28 and the LP turbine 30, the gases force turbine blades to rotate a drive shaft 34 along an axis of the turbine system 10. As illustrated, the drive shaft 34 is connected to various components of the turbine system 10, including the HP compressor 16 and the LP compressor 14. It is to be understood that, other turbine systems may include intermediate pressure compressors, intermediate pressure turbines, and other arrangement of component systems, including shaft arrangements and couplings to the generator 34.

The drive shaft 34 may include one or more shafts that may be, for example, concentrically aligned. The drive shaft 34 may include a shaft connecting the HP turbine 28 to the HP compressor 16 to form a HP rotor. The HP compressor 16 may include blades coupled to the drive shaft 34. Thus, rotation of turbine blades in the HP turbine 28 causes the shaft connecting the HP turbine 28 to the HP compressor 16 to rotate blades within the HP compressor 16. This compresses air in the HP compressor 16. Similarly, the drive shaft 34 includes a shaft connecting the LP turbine 30 to the LP compressor 14 to form a LP rotor. The LP compressor 14 includes blades coupled to the drive shaft 34. Thus, rotation of turbine blades in the LP turbine 30 causes the shaft connecting the LP turbine 30 to the LP compressor 14 to rotate blades within the LP compressor 14. The compressed air is fed to the combustor 26 and mixed with fuel to allow for higher efficiency combustion. Thus, the turbine system 10 may include a dual concentric shafting arrangement, wherein LP turbine 30 is drivingly connected to LP compressor 14 by a first shaft in the drive shaft 34, while the HP turbine 28 is similarly drivingly connected to the HP compressor 16 by a second shaft in the drive shaft 34 internal and concentric to the first shaft. The shaft 34 may also be connected to an electrical generator 34 or any other load, such as a mechanical load. The generator 34 may be connected to an electrical distribution grid 36 suitable for distributing the electricity produced by the generator 34.

Figure 2:
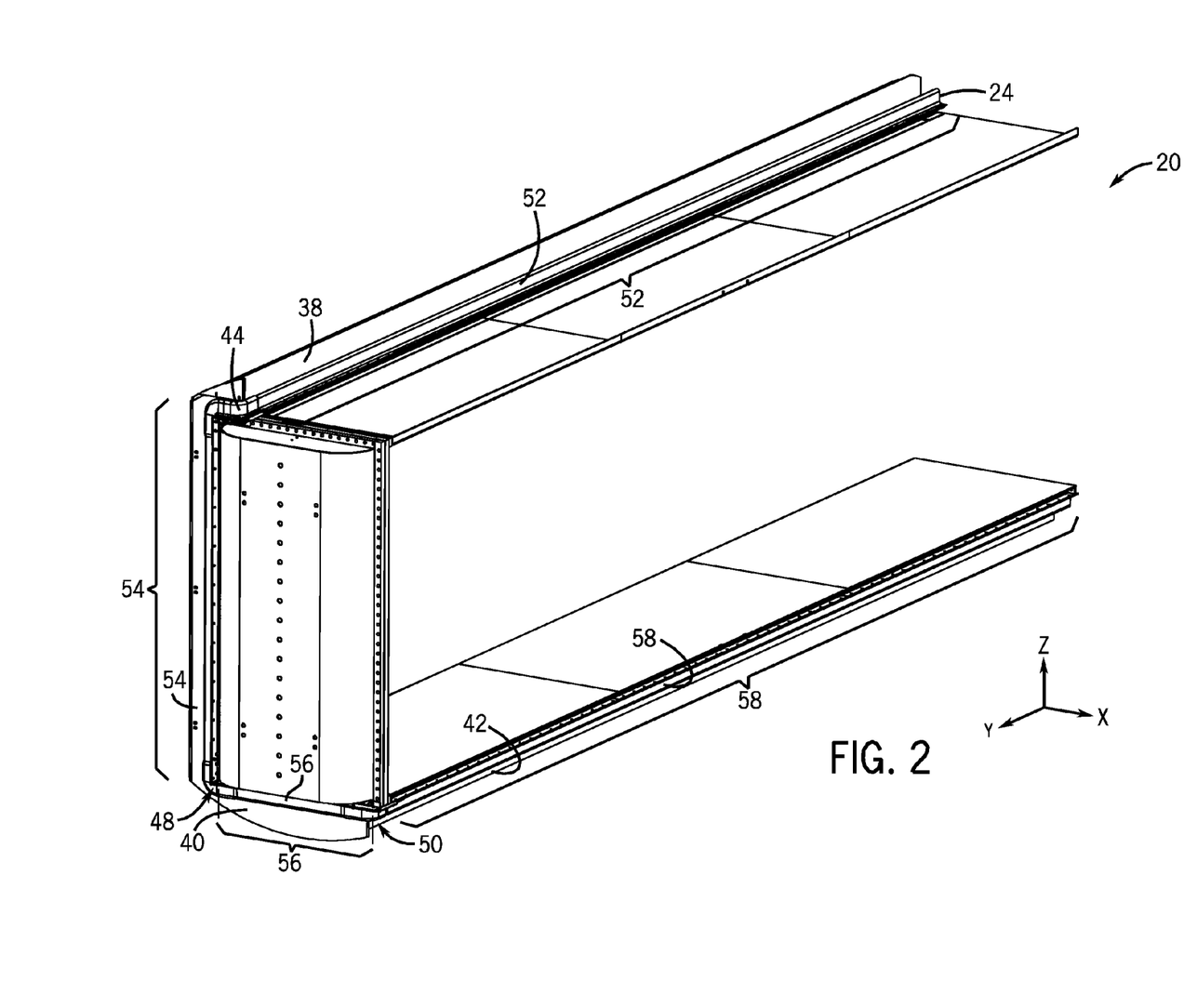
FIG. 2 is a perspective view of an embodiment of the seal disposed along a portion of the heat exchanger of FIG. 1.

FIG. 2 is a perspective view illustrating an embodiment of the seal 24 disposed along surfaces or walls 38, 40, and 42 of the outer shell chamber 22. As discussed in detail below, the seal 24 has a cross-sectional shape (e.g., one or more bends) that enable expansion and contraction between sealing surfaces, while being coupled to both sealing surfaces. Furthermore, the seal 24 follows the contours of the walls 38, 40, and 42. Indeed, the seal 24 includes curved sections 44, 48, and 50, which may curve or bend over angles of approximately 0° to 180°, 0° to 90°, or 0° to 45°. For example, the curved sections 44, 48, and 50 may curve or bend over an angle of approximately 15°, 30°, 45°, 60°, 75°, 90°, 115°, 130°, 145°, 160°, or 175° to follow the contours of the inner tube bundle 20. In certain embodiment, the curved sections 44, 48, and 50 may continuously curve over the angle, while other embodiments may incrementally turn around the angle with a plurality of incremental angled portions. The seal 24 also includes certain substantially straight or linear sections 52, 54, 56 and 58 generally excluding curves or bends.

The seal 24 may be a one-piece or multi-piece structure, and thus may be installed as a single unit or multiple sections. In certain embodiments, the seal 24 may be molded or cast as a continuous one-piece structure. However, some embodiments of the seal 24 may employ manufacturing techniques, such as extrusion, which do not permit formation as a continuous one-piece structure. For example, the curved sections 44, 48, and 50 may be cast or molded to define the desired radius of curvature, while the straight sections 52, 54, 56, and 58 may be extruded to the desired length. After forming the various sections 44, 48, 50, 52, 56, 56, and 58, the sections may be coupled together prior to installation, or the sections may be independently installed to the sealing surfaces. In one embodiment, the curved sections 44, 48, and 50 may be manufactured separately from the straight or linear sections 52, 54, 56 and 58, and then the sections 44, 48, 50, 52, 54, 56 and 58 may be joined or connected to form the seal 24 as a one-piece structure. For example, the sections 44, 48, 50, 52, 54, 56 and 58 may be joined by overlapping certain portions of the sections 44, 48, 50, 52, 54, 56 and 58, and applying an adhesive or glue, such as a silicone-based glue, to securely glue the sections 44, 48, 50, 52, 54, 56 and 58 together. However, the sections may be coupled together with other adhesives such as, for example, cyanoacrylate based glues, contact cement (e.g., neoprene and synthetic rubber mix), or polyurethane glues. In another embodiment, the sections 44, 48, 50, 52, 54, 56 and 58 may be joined by overlapping certain portions of the sections, and then thermally bonding the sections by applying heat and a compressive force to the overlapping portions. The thermal bonding may form a secure bond between overlapping portions of the sections 44, 48, 50, 52, 54, 56 and 58 to form the seal 24 as a one-piece structure. In yet another embodiment, the overlapping portions of the sections 44, 48, 50, 52, 54, 56 and 58 may be solvent welded together. In solvent welding, a solvent is applied to the overlapping portions. The solvent may temporarily dissolve or "melt" surfaces of the overlapping portions, which may then intermingle with one another. The solvent may then permeate out into the environment, leaving behind a secure joint.

The seal 24 is configured to couple to both of the sealing surfaces, while the cross-sectional shape (e.g., one or more bends) enables expansion and contraction between the sealing surfaces. For example, the sections 44, 48, 50, 52, 54, 56 and 58 may be coupled to both sealing surfaces using adhesives, nuts and bolts, latches, snap-fit mechanisms, dovetail joints, or any other suitable fastener. Depending on the construction of the seal 24, each section 44, 48, 50, 52, 54, 56, and 58 may be independently coupled to the sealing surfaces with or without overlap between adjacent sections. However, if the seal 24 is a one-piece structure, then the seal 24 may include any arrangement of adhesives or fasteners along the sealing surfaces. In certain embodiments, an adhesive may be applied continuously along the sealing surfaces between the seal 24 and the sealing surfaces. For example, the adhesive may be a metal-to-rubber bonding substance, such as a mixture of reactive polymers and pigments in methyl isobutyl ketone (e.g., Megum™, Thixon™), and/or acrylic copolymers (e.g., Robond™). In this manner, the seal 24 maintains a fluid tight seal with both sealing surfaces, while the cross-sectional shape (e.g., one or more bends) of the seal 24 can expand or contract in response to variations in the gap between the sealing surfaces.

Figure 3:
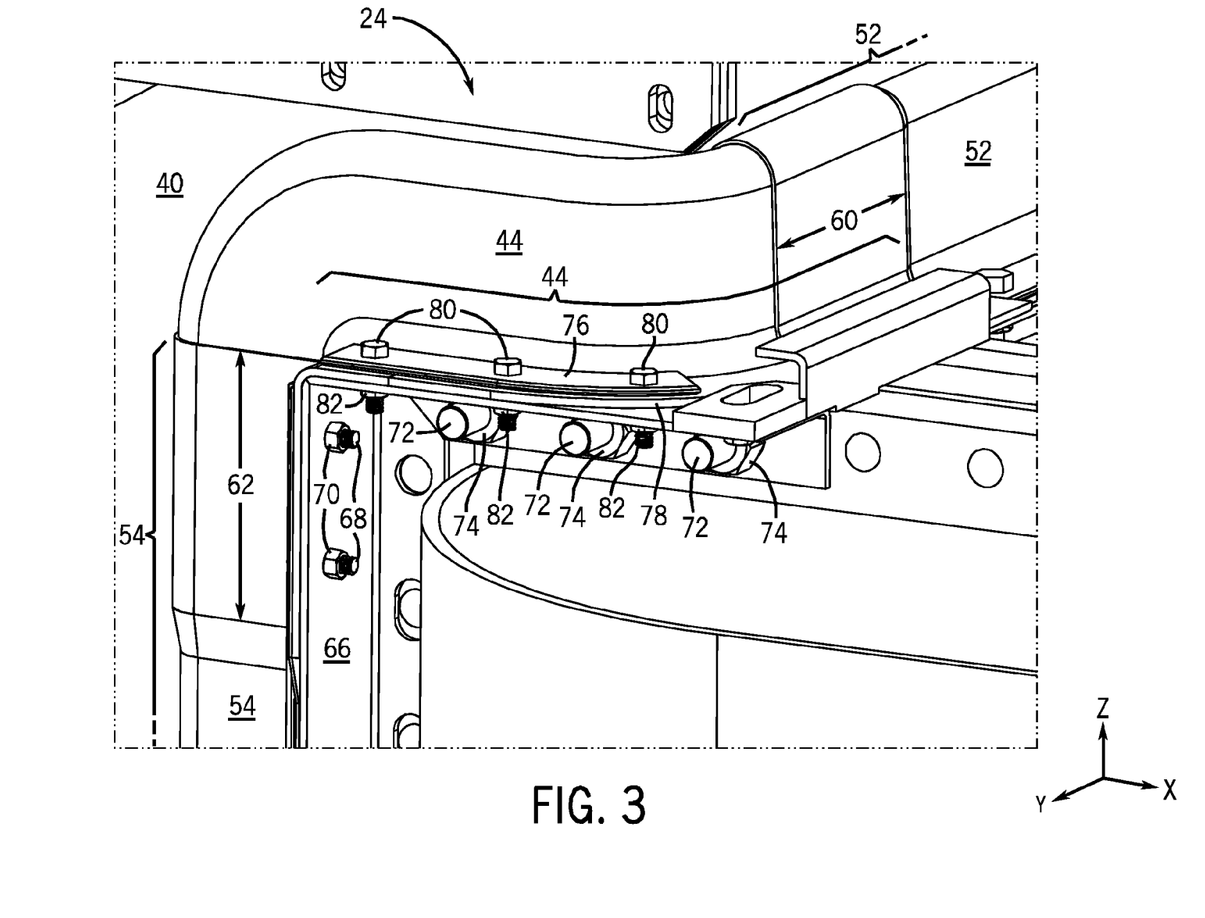
FIG. 3 is a partial perspective view of an embodiment of the seal of FIG. 2.

FIG. 3 is a partial perspective view of an embodiment of the seal 24 of FIG. 2, illustrating details of the section 44 and portions of the sections 52 and 54. In the illustrated embodiment, the section 44 is curved approximately 90° about both the Y-axis and Z-axis. Indeed, the section 44 is illustrative of the seal 24 following the contours of the inner tube bundle chamber 20 (shown in FIGS. 1 and 2), including any curved surfaces and/or bends. As mentioned above, the sections 44, 52, and 54 may be overlapped to improve the ability of the seal 24 to block movement of a fluid, such as a gas or a liquid. Indeed, overlapped portions 60 and 62 may suitably block or seal movement of fluid while securely fastening the sections 44, 52, and 54 to each other.

FIG. 3 also illustrates the fastening of the seal 24 to the inner tube bundle chamber 20 by using threaded bolts and nuts. Indeed, commonly available tools, such as a wrench or spanner, may be used to install or to replace the seal 24. For example, the seal 24 may be positioned approximately adjacent to the wall 40 and disposed on a ledge 66 of the inner tube bundle chamber 20. Bolts 68 may be used with a corresponding nut 70 to fasten the seal 24 to the wall 40. In certain embodiments, the mounting bracket (e.g., metal ledge 66) may first be fastened to the inner tube bundle chamber 20, for example, by using threaded bolts 72 and nuts 74. For example, the metal ledge 66 may be an L-shaped mounting bracket. The seal 24 may then be disposed on the metal ledge 66 to rest on the metal ledge 66. A flange, such as a curved flange (e.g., "backing bar") 76, may be disposed on top of an edge 78 (e.g., mount portion) of the seal 24. The flange 76, the seal edge 78, and the ledge 66 may then be fastened together by using, for example, threaded bolts 80 and nuts 82. In this way, the seal 24 may be securely fastened to the inner tube bundle chamber 20, so as to provide for a suitable blocking of fluid flow. Further, the seal 24 may include certain shapes, such as "U", "V", "S", and square shapes, useful in enabling portions of the inner tubular chamber 20 to move with respect to one another (or with respect to the outer shell 22), without compromising the integrity of the seal 24, as described in more detail below with respect to FIG. 4. In other words, the seal 24 may have a wavy, winding, zigzagging, or generally not linear cross-section to enable expansion and contraction like a spring or like an accordion bellows. Thus, the seal 24 may be described as a spring-type seal 24.

Figure 4:
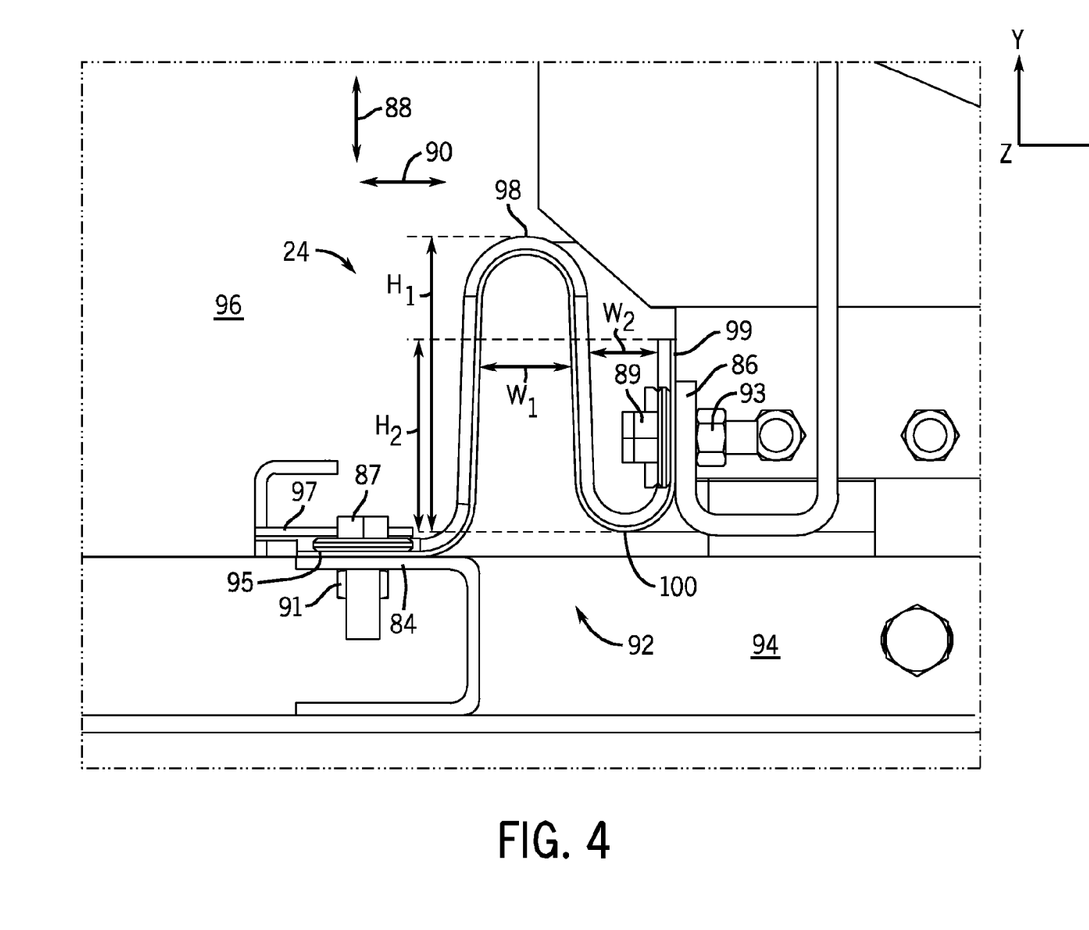
FIG. 4 is a cross-sectional side view of an embodiment of the seal of FIG. 3.

FIG. 4 is a cross-sectional side view of an embodiment of the seal 24. In the depicted embodiment, the seal 24 is attached to metal ledges 84 and 86 by using bolts 87 and 89 and nuts 91 and 93. For example, an edge 95 (e.g., mount portion) of the seal 24 may be secured between a ledge 84 and a flange 97, by passing the bolt 87 through the flange 97, edge 95, and ledge 84 and then threading the nut 91 onto the bolt 87. Likewise, an edge 99 (e.g., mount portion) of the seal 24 may be fastened to a ledge 86 by using the bolt 89 and the nut 93. The metal ledges 84 and 86 may experience thermal changes, and may subsequently expand or contract relative to one another. Indeed, the metal ledges 84 and 86 may move in one or more directions such as directions 88 along the Y-axis and/or directions 90 along the X-axis. In some instances, the movements in the directions 88 and 90 may be of approximately between 0.5 cm and 10 centimeters. Accordingly, the seal 24 may include certain shapes, such as a depicted "double-U" shape 92, suitable for enabling the movement of the ledges 84 and/or 86 while continuing to block movement of fluids from an area 94 to an area 96 (or vice versa).

In the depicted embodiment, the "double-U" shape 92 includes a first "U" shape or bend 98 having a width $W_1$ and height $H_1$, followed by a second "U" shape or bend 100 having a width $W_2$ and a height $H_2$. That is, certain sections of the seal 24 may be shaped as a "double-U", i.e., include two bends or "U" shapes 98 and 100. In one embodiment, the width $W_1$ is approximately equal to the width $W_2$. In another embodiment, the width $W_1$ is approximately smaller than the width $W_2$. In yet another embodiment, the width $W_1$ is approximately larger than the width $W_2$. Likewise, in one embodiment, the height $H_1$ may be approximately equal to the height $L_2$, while in another embodiment, the heights $H_1$ and $H_2$ may be different. Indeed, the widths $W_1$ and $W_2$, and the heights $H_1$ and $H_2$, may be combined so as to enable movements of the ledges 84 and 86 of approximately between 0.5 cm to 10 cm. For example, should the ledge 84 move in the direction 90 outwardly from the ledge 86, then the first "U" shape 98 and/or the second "U" shape 100 may expand widthwise, resulting in an increase of the width $W_1$ and/or $W_2$. Likewise, should the ledge 84 move in the direction 90 inwardly towards the ledge 86, then the first "U" shape 98 and/or the second "U" shape 100 may contract widthwise, resulting in a decrease of the width $W_1$ and/or $W_2$.

Similarly, should the ledge 84 move in the direction 88 inwardly, then the first "U" shape 98 and/or the second "U" shape 100 may expand height wise, resulting in an increase of the height $H_1$ and/or $H_2$. Should the ledge 84 move in the direction 88 outwardly, then the first "U" shape 98 and/or the second "U" shape 100 may contract height wise, resulting in a decrease of the height $H_1$ and/or $H_2$. As the ledges 84 and 86 expand or contract relative to one another, the shapes 98 and/or 100 respond by expanding or contracting to maintain the seal between the ledges 84 and 86. In this way, the seal 24 essentially absorbs any movements, such as thermally-induced movements, while continuing to provide suitable blocking of any fluid flows from the area 94 into the area 96 (or vice versa). Again, this capability of the seal 24 to absorb movements while remaining fixed at opposite edges 95 and 99 ensures a continuous seal despite changes in the gap between the ledges 84 and 86. In other words, the U-shapes 98 and 100 act like a spring element, shock absorber, or resilient element between the edges 95 and 99, such that the edges 95 and 99 remain sealed to the ledges 84 and 86.

It should also be noted that the seal 24 may enable movements in many directions additional or alternative to the directions 88 and 90. Indeed, because of the flexibility of material and the "U" shapes 98 and 100, the seal 24 may enable movements in 3-dimensional directions, e.g., X-axis, Y-axis, and/or Z-axis. It is also to be noted that, in another embodiment, the two "U" shapes 98 and 100 may be replaced with a shape having a single "U". In other embodiments, 3, 4, 5, 6, 7, 8, 9, 10 "U" shapes may be used. Indeed, other shapes may be used, including shapes having one or more "V" shapes, "S" shapes, one or more square shapes, and the like. Further, the shapes may be combined such that a "U" shape may be positioned next to a "V" shape and a square shape. Indeed, the seal may be manufactured to include "U", "V" "S", and square shapes so as to follow desired contours of the inner tube bundle chamber 20.

Figure 5:
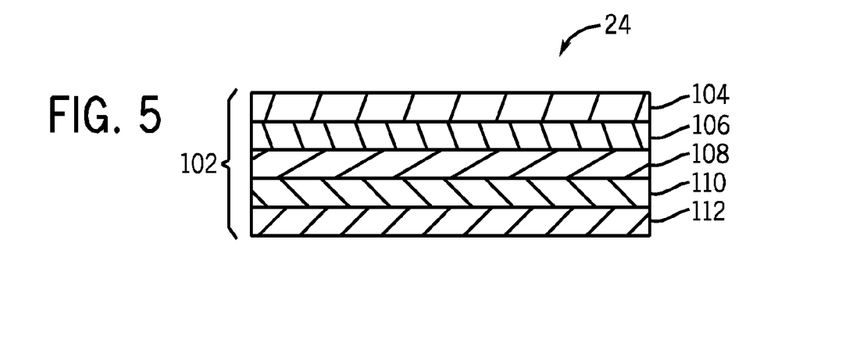
FIG. 5 is a cross-sectional side view of an embodiment of a seal.

FIG. 5 is a cross-sectional side view illustrating an embodiment of the seal 24 prior to forming the seal 24 into a desired shape. More specifically, the figure depicts a seal or substrate stack 102, including substrates or layers 104, 106, 108, 110, and 112. The substrates 104, 106, 108, 110, and 112 may be used to provide flexible and/or thermally-resistive properties, as well as enhanced durability. In the depicted embodiment, the substrates 104, 108, and 112 may be manufactured out of a flexible or elastic, non-metallic, moisture-resistant or liquid-repellant material, such as a synthetic rubber, a natural rubber, a polymer based material, a co-polymer based material, and/or an elastomer. Accordingly, the substrates 104, 108, and 112 may provide flexible properties to the seal 24. The flexible substrates 104, 108, and 112 may also provide for a suitable blocking barrier against fluids such as water and air. Indeed, the substrates 104, 108, and 112 may include hydrophobic properties suitable for repelling water and other liquids. The flexible substrates 104, 108, and 112 may also be manufactured out of a chemical resistant non-metallic material, including non-metallic chemical resistant materials, such as a polytetrafluoroethylene (e.g., Teflon™), acid and/or resistant fiberglass fabric (e.g., GORE™).

The substrates 106 and 110 may be manufactured out of heat-resistive materials, such as an aramid material (e.g., Nomex™, Kevlar), a fire retardant nylon, a fire retardant rayon, and/or an oxidized Pan fabric materials (e.g., Pyromex™) Accordingly, the substrates 106 and 110 may provide for thermally-resistive properties by enhancing thermal protection in hot environments, such as the intercooler 12 shown in FIG. 1. Additionally, the heat-resistive materials may include fire or flame retardant materials, including a cotton fabric impregnated with a flame retardant chemical; a vinal and polynosic rayon blend; an aramid synthetic fiber; a meta-aramid and para-aramid fiber blend; a meta-aramid, para-aramid, and modacrylic fiber blend; an oxidized polyacrylonitrile and aramid fiber blend; or a combination thereof. The substrates 104, 106, 108, 110, and 112 may disposed or stacked on top of each other, as depicted, to form the seal stack 102. The seal stack 102 may then be heated and compressed, as described in more detail below with respect to FIG. 6, resulting in a flexible, thermally-resistive seal 24 suitable for blocking the movement of fluid while providing for enhanced flexibility of movement.

Various embodiments of the seal 24 may include more or less of the substrates 104, 106, 108, 110, and 112, e.g., 1 to 10 or more. For example, in one embodiment, the seal 24 may be manufactured out of 3 substrates, such as a top substrate made of flexible material (e.g., rubber, polymer based materials, co-polymer based materials, elastomers), a middle substrate made of thermally-resistive material (e.g., aramids, fire retardant nylon, fire retardant rayon, oxidized Pan fabric), and a bottom substrate made of flexible material (e.g., rubber, polymer based materials, co-polymer based materials, elastomers). In other embodiments, more than 5 substrates may be used, such as 7, 9, 11, 13 substrates. In these embodiments, the substrates including the flexible material, and the substrates including the thermally-resistive material, may be interspaced with one another so as to form the seal 24. That is, a first substrate (e.g., flexible material)

may be disposed as a bottom layer of the seal 24, then a second substrate (e.g., thermally-resistive material) may be placed on top of the first substrate, then a third substrate (e.g., flexible material) may be placed on top of the second substrate, then a fourth substrate (e.g., thermally-resistive material) may be placed on tope of the third substrate, and so on.

In certain embodiments, the top and bottom layers may be manufactured out of the flexible material (e.g., rubber, polymer based materials, co-polymer based materials, elastomers). In these embodiments, the top and bottom layers may be smooth, thus minimizing turbulence or eddies on the outside of the seal 24. In other embodiments, the top and bottom layers may be manufactured out of the thermally-resistive material (e.g., aramids, fire retardant nylon, fire retardant rayon, oxidized Pan fabric). In these embodiments, the top and bottom layers may provide for enhanced thermal protection to the outside walls of the seal 24. In yet other embodiments, the top layer may be manufactured out of the flexible material, while the bottom layer may be manufactured out of the thermally-resistive material (or vice versa) depending on desired properties such as reduced turbulence and increased thermal resistance. Additionally, the seal 24 may be manufactured to include one or more shapes (e.g., "U," "V," "S", square) suitable for enabling a movement of the seal 24 while continuing to provide a blocking of fluid.

Figure 6:
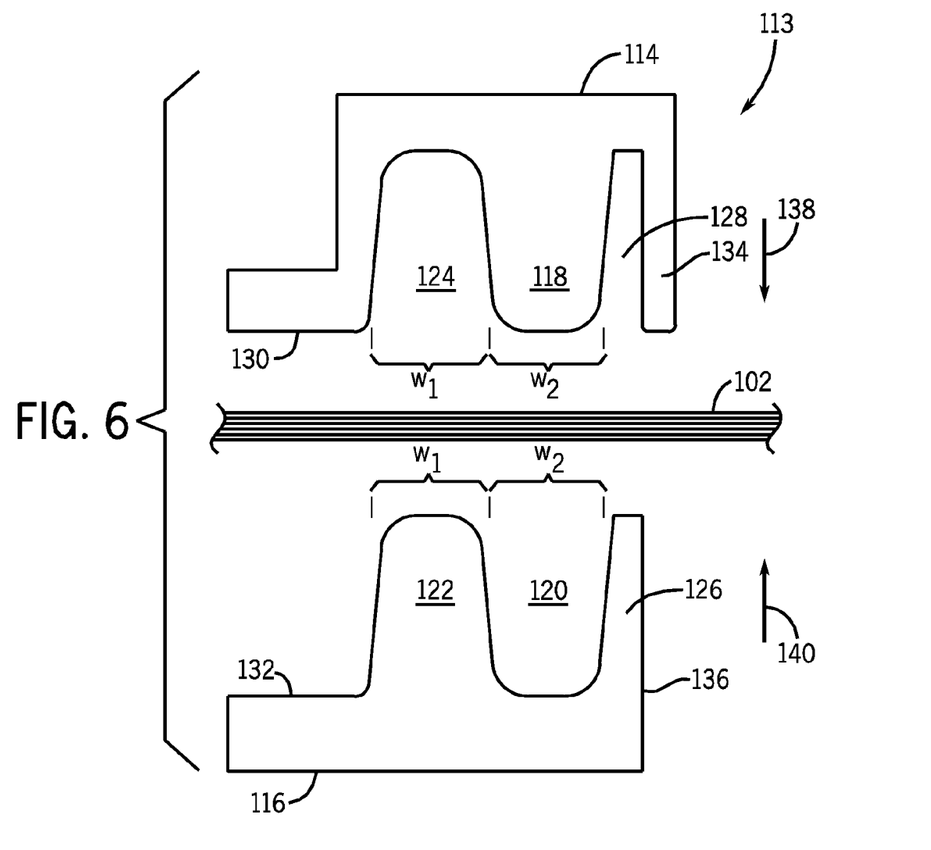
FIG. 6 is a cross-sectional side view of an embodiment of a mold and a seal.

FIG. 6 is a cross-sectional side view illustrating an embodiment of a mold system 113 with molds 114 and 116, exploded about the substrate stack 102, such that the molds 114 and 116 may be compressed about the substrate stack 102 to form the two "U" shapes 98 and 100 as shown in FIG. 4. In the depicted embodiment, the molds 114 and 116 have been designed so as to mate with each other, for example, when used as part of a compression molding press of the system 113. Accordingly, a protrusion 118 of the mold 114 is shaped to be pressed or inserted inside a channel 120 of the mold 116, a protrusion 122 of the mold 116 is shaped to be pressed or inserted inside a channel 124 of the mold 114, and a protrusion 126 of the mold 116 is shaped to be pressed or inserted inside a channel 128 of the mold 114. The protrusion 122 and the channel 124 may have a width of approximately $W_1$, while the protrusion 118 and the channel 120 may have a width of approximately $W_2$, suitable for shaping the substrate stack 102 into the "U" shapes 98 and 100 shown in FIG. 4. The figure also depicts a flat portion 130 of the mold 114 shaped to press against a flat portion 132 of the mold 116, suitable for shaping the edge 95 shown in FIG. 4, and a protrusion 134 of the mold 114 shaped to engage a side wall 136 of the mold 116, suitable for shaping the edge 99. During manufacturing operations, the substrate stack 102 is placed between the two molds 114 and 116, as depicted, and the compression molding press of the system 113 is then actuated so as to compressively shape the substrate stack 102 into the seal 24. That is, the molds 114 and 116 may be compressed toward one another in directions 138 and 140 to press the substrate stack 102 into the seal 24. The compression pressures may be of approximately between 20 bar to 250 bar. Accordingly, a bended seal structure may be formed, suitable for allowing expansion and contraction in response to dimensional changes in sealed gaps.

Figure 7:
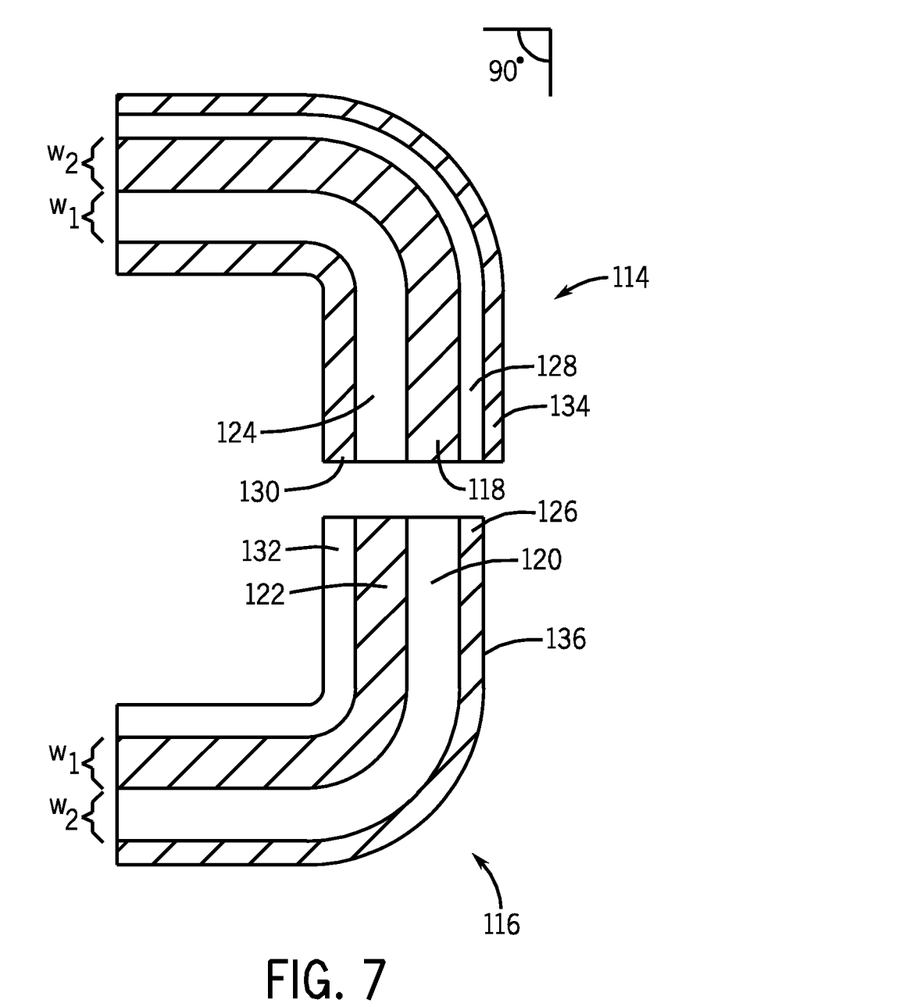
FIG. 7 is a bottom view of an embodiment of the mold of FIG. 6.
Figure 8:
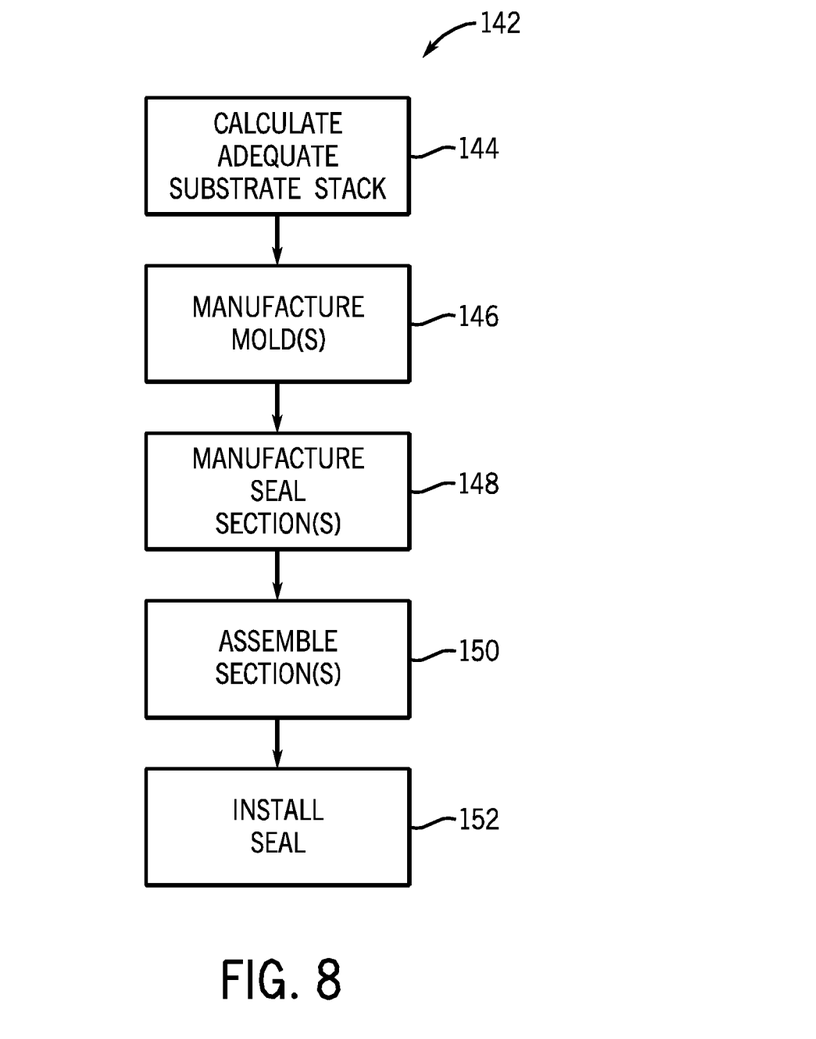
FIG. 8 is a flow chart illustrating an embodiment of a process for manufacturing a seal.

Additionally, the molds 114 and/or 116 may be heated so as to transfer heat into the substrate stack 102. By heating the substrate stack 102 while also compressing the substrate stack 102, the molds 114 and 116 may enable a fusing or bonding of the substrates 104, 106, 108, 110, and 112 shown in FIG. 5 of the substrate stack 102. This fusing or bonding of the substrates 104, 106, 108, 110, and 112 may securely bond the substrates 104, 106, 108, 110, and 112 to each other. The resulting seal 24 may thus include a flexible, thermally-resistant substrate stack 102. It is to be noted that the molds 114 and 116 may be designed to compress more or less "U" shapes, as desired. Indeed, the bended portions, such as the "U" shapes, "V" shapes, "S" shapes, and/or square shapes may alternatingly bend back and forth in opposite directions. Further, the molds 114 and 116 may be designed to manufacture a seal 24 suitable for following the contour of the inner tube bundle chamber 20, including contours having 30°, 45°, 60°, 75°, 90°, 105°, 120°, 135° angular bends, or angular bend of between approximately 1° and 180°, as depicted in FIGS. 7 and 8. Additionally, the molds 114 and 116 may be designed to manufacture seal portions having multiple bends or curves, suitable for following multiple bends in the contour of the inner tube bundle chamber 20. For example, a seal portion having a first 90° bend followed by a second 90° bend may be manufactured.

FIG. 7 is a bottom view of embodiments of the molds 114 and 116 of FIG. 6. In the depicted embodiment, the molds 114 and 116 are curved approximately 90°, so as to more closely follow a 90° bend that may be found in the inner tube bundle chamber 20, such as with the section 44 of the seal 24 shown in FIG. 3. The depicted embodiment shows the flat portion 130, the channel 124, the protrusion 118, the channel 128, and the protrusion 134 of the mold 114. Likewise, the flat portion 132, the protrusion 122, the channel 120, and the protrusion 126 of the mold 116 are depicted. As mentioned above, the molds 114 and 116 may compress and transfer heat to the substrate stack 102 shown in FIG. 5 so as to shape the substrate stack 102 into, for example, the "U" shapes 98 and 100 shown in FIG. 4. Accordingly, the protrusion 118 of the mold 114 is shaped to be pressed or inserted inside the channel 120 of the mold 116, the protrusion 122 of the mold 116 is shaped to be pressed or inserted inside the channel 124 of the mold 114, and the protrusion 126 of the mold 116 is shaped to be pressed or inserted inside the channel 128 of the mold 114. Likewise, the protrusion 134 of the mold 114 slides adjacent to the side wall 136 of the mold 116. The protrusion 122 and the channel 124 may have a width of approximately $W_1$, while the protrusion 118 and the channel 120 may have a width of approximately $W_2$ useful in shaping the two "U" shapes 98 and 100. It is to be understood that other mold shapes may be used to manufacture the seal 24. For example, molds having approximately linear (i.e., straight) sections, rather than the illustrated 90° bends, may be used to manufacture the seal 24 sections 52, 54, 56, and 58 shown in FIG. 2.

FIG. 8 is a flow chart illustrating an embodiment of a process 142 suitable for manufacturing and installing the seal 24 shown in FIG. 1. The process 142 may include logic or instructions stored in a non-transitory machine readable media. For example, the process 142 may include computer instructions stored in the media (e.g., memory) and executable by a computing device to implement the techniques disclosed herein. The process 142 may first calculate an adequate substrate stack (block 114) suitable for a desired application. For example, if the seal 24 is to be used as an intercooler seal 24, then the adequate substrate stack may include the layers 104, 106, 108, 110, and 112 as depicted above with respect to FIG. 5. Other applications for the seal 24, such as applications using liquids (e.g., water, gasoline, oil), may include greater or fewer substrates having liquid-repellent properties (e.g., synthetic rubber).

The process 142 may then manufacture one or more molds (block 146) suitable for shaping various sections of the seal 24, such as the curved sections 44, 48, and 50, and straight sections 52, 54, 56, and 58 illustrated in FIG. 2. For example, computer-aided design (CAD) drawings and/or computer-aided manufacturing (CAM) drawings of the surfaces to be sealed may be used to create the one or more molds suitable for following the contours of the surfaces. The suitable mold(s), may then be manufactured (block 146) based on the CAD drawings. The process 142 may then manufacture one or more seal 24 sections (block 148) based on the manufactured mold(s). For example, the seal 24 sections may be manufactured by using the mold(s) to apply heat and a compressive force, as described above with respect to FIGS. 6 and 7. The process 142 may then assemble the section(s) (block 150). For example, the sections may be assembled by gluing or otherwise bonding overlapping portions of the sections, as described in more detail above with respect to FIG. 5. In this way, the seal 24 may be constructed. The process 142 may then install the seal 24 (block 152), for example, by fastening the seal 24 to surfaces using threaded bolts and nuts. The installed seal 24 may then provide suitable blocking of fluids and enable certain movements, such as thermally-induced movements, while continuing to provide suitable gap coverage.

Technical effects of the invention include the use of a seal that includes thermally-resistive properties enabling a placement of the seal in hot environments (e.g., intercoolers, turbine systems, compressors, expanders, pumps). The seal also includes a shape and flexible properties that enable movements, such as thermally-induced movements, while maintaining a suitable block or seal against fluid flows. The seal may further include curved sections suitable for following curved corners and other curved contours, as well as straight surfaces. A method of manufacturing the seal is also provided, that enables a layering or stacking of various substrates so as to manufacture a flexible seal having enhanced thermal resistance. The method of manufacture may manufacture the seal in sections, which may then be joined or fastened into a single seal.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
a heat exchanger comprising:
  a first chamber and a second chamber; and
  a seal, comprising:
    a first layer made of a first non-metallic, elastic material;
    a second layer made of a second non-metallic, heat resistant material configured to thermally protect the first layer from heat, wherein the seal is configured to extend across a gap between first and second surfaces, and the first and second layers are formed into a bended structure configured to expand and contract in a first direction in response to a dimensional change in the gap, wherein the first surface abuts the first chamber and the second surface abuts the second chamber, wherein the bended structure is formed into a curved shape configured to follow, in a second direction, a contour of the heat exchanger, wherein the first and the second direction are on different planes 90 degrees from one another; and
a turbine system configured to provide power, wherein the turbine system comprises a low pressure compressor; a high pressure compressor; a first conduit fluidly coupling the high pressure compressor to the first chamber; and a second conduit fluidly coupling the low pressure compressor to the second chamber.

2. The system of claim 1, wherein the first non-metallic, elastic material of the first layer comprises a polymer, an elastomer, a rubber, or a combination thereof.

3. The system of claim 1, wherein the first non-metallic, elastic material of the first layer comprises a liquid repellant material.

4. The system of claim 1, wherein the second non-metallic, heat resistant material of the second layer comprises an aramid.

5. The system of claim 1, wherein the second non-metallic, heat resistant material of the second layer comprises a fire retardant material.

6. The system of claim 1, wherein the seal comprises a third layer made of a third non-metallic, elastic material, wherein the second layer is disposed between the first and third layers.

7. The system of claim 1, wherein the seal comprises a third layer made of a third non-metallic, heat resistant material configured to thermally protect the first layer from heat, wherein the first layer is disposed between the second and third layers.

8. The system of claim 7, wherein the seal comprises a fourth layer made of a fourth non-metallic, elastic material and a fifth layer made of a fifth non-metallic, elastic material, wherein the second layer is disposed between the first and fourth layers, wherein the third layer is disposed between the first and fifth layers.

9. The system of claim 1, wherein the seal comprises a third layer made of a third non-metallic, chemical resistant material.

10. The system of claim 1, wherein the seal comprises opposite first and second mounting portions coupled to the bended structure, the first mounting portion is configured to couple the seal to the first surface, and the second mounting portion is configured to couple the seal to the second surface.

11. The system of claim 1, wherein the bended structure comprises at least one U-shaped bend, V-shaped bend, S-shaped bended, rectangular-shaped bend, or a combination thereof, and wherein the curved shape comprises a 90° curve.

12. The system of claim 1, wherein the bended structure comprises a plurality of bended portions that alternatingly bend back and forth in opposite directions.

13. The system of claim 1, wherein the seal comprises a first section bonded to a second section along an overlapping portion, the first section has the first and second layers, and the second section has the first and second layers.

14. A system comprising:
a heat exchanger comprising:
  a first chamber and a second chamber; and
  an expansion joint seal, comprising:
    a first mount portion configured to be fastened to a first surface of the first chamber;

a second mount portion configured to be fastened to a second surface of the second chamber;

an intermediate portion extending between the first and second mount portions, wherein the intermediate portion comprises at least one bend configured to enable expansion and contraction of the expansion joint seal across a gap between the first and second surfaces in a first direction while the first and second mount portions are fastened to the respective first and second surfaces, wherein the bend is formed into a curved shape configured to follow, in a second direction, a contour of the heat exchanger, wherein the first and the second direction are on different planes 90 degrees from one another; and a turbine system configured to provide power, wherein the turbine system comprises a low pressure compressor; a high pressure compressor; a first conduit fluidly coupling the high pressure compressor to the first chamber; and a second conduit fluidly coupling the low pressure compressor to the second chamber.

15. The system of claim 14, wherein the system comprises a turbine system comprising a low pressure compressor; a high pressure compressor; a first conduit fluidly coupling the high pressure compressor to the first chamber; and a second conduit fluidly coupling the low pressure compressor to the second chamber.

16. The system of claim 15, wherein the expansion joint seal comprises a first threaded fastener securing the first mount portion to the first surface, and a second threaded fastener securing the second mount portion to the second surface.

17. The system of claim 16, wherein the intermediate portion comprises a plurality of bends that alternatingly bend back and forth in opposite directions, and wherein the curved shape comprises a 90° curve.

18. The system of claim 15, wherein the intermediate portion comprises a layered structure having at least one first layer made of a non-metallic, elastic material and at least one second layer made of a non-metallic, heat resistant material.

19. A method of manufacturing a seal comprising:
manufacturing a heat exchanger for a turbine system comprising a first chamber; a second chamber; and a seal coupling the first chamber to the second chamber, wherein manufacturing the seal comprises:
disposing a first substrate on top of a second substrate;
disposing the second substrate on top of a third substrate;
positioning the first, the second, and the third substrates on a mold;
heating the mold; and compressing the first, the second, and the third substrates in the mold, wherein the mold comprises a shape configured to enable the seal to expand and to contract in a first direction, and the shape comprises a "U" shape, a "V" shape, a square shape, or a combination thereof, and wherein the mold comprises a curve configured to follow, in a second direction, a contour of the heat exchanger, wherein the first and the second direction are on different planes 90 degrees from one another;
wherein the turbine system comprises a low pressure compressor; a high pressure compressor; a first conduit fluidly coupling the high pressure compressor to the first chamber; and a second conduit fluidly coupling the low pressure compressor to the second chamber.

* * * * *